United States Patent
Delidais et al.

(10) Patent No.: US 8,949,141 B2
(45) Date of Patent: Feb. 3, 2015

(54) METHOD FOR ACCESSING GOODS OR SERVICES FOLLOWING AN ACTION PERFORMED BY A VIEWER OF BROADCAST PROGRAM CONTENT

(75) Inventors: Alexandre Delidais, Saint-Barthelemy (CH); Gilles Rapin, St. Aubin (CH); Stelio Tzonis, Pully (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 406 days.

(21) Appl. No.: 13/140,365

(22) PCT Filed: Dec. 16, 2009

(86) PCT No.: PCT/EP2009/067305
§ 371 (c)(1),
(2), (4) Date: Sep. 6, 2011

(87) PCT Pub. No.: WO2010/069999
PCT Pub. Date: Jun. 24, 2010

(65) Prior Publication Data
US 2011/0314491 A1    Dec. 22, 2011

(30) Foreign Application Priority Data
Dec. 19, 2008   (EP) ..................... 08172312

(51) Int. Cl.
*G06Q 30/00*    (2012.01)
*H04N 7/16*    (2011.01)
(Continued)

(52) U.S. Cl.
CPC .......... *H04H 60/63* (2013.01); *H04N 7/17318* (2013.01); *H04N 21/235* (2013.01);
(Continued)

(58) Field of Classification Search
USPC ............. 705/14.1–14.16, 14.19, 14.4, 14, 41; 725/23
See application file for complete search history.

(56) References Cited

U.S. PATENT DOCUMENTS 7,149,899 B2   12/2006  Pinkas et al.
7,197,646 B2   3/2007   Fritz et al.
(Continued)

FOREIGN PATENT DOCUMENTS

EP   1 111 924    6/2001
EP   1 607 826    12/2005
(Continued)

OTHER PUBLICATIONS

International Search Report issued in PCT/EP2009/067305, mailed Mar. 2, 2010.
(Continued)

*Primary Examiner* — Nasser Goodarzi
*Assistant Examiner* — Kyu Chae
(74) *Attorney, Agent, or Firm* — DLA Piper LLP US

(57) ABSTRACT

A method is described for rewarding a viewer of a broadcast program in exchange for the viewer proving his presence at the time that certain program content is being broadcast. The method involves the use of running an application in a television environment, said application displaying a graphic inviting the viewer to intervene in some manner and to subsequently log the viewer's intervention, thereby documenting his viewing activity. The method further allows for the convenient and mobile reporting of the status of a log of the viewer's viewing activity. Finally, the method allows for the convenient and flexible redemption of accrued credit, as documented in the viewing log, against goods and/or services.

19 Claims, 2 Drawing Sheets

(51) Int. Cl.
*H04H 60/63* (2008.01)
*H04N 7/173* (2011.01)
*H04N 21/235* (2011.01)
*H04N 21/236* (2011.01)
*H04N 21/434* (2011.01)
*H04N 21/435* (2011.01)
*H04N 21/475* (2011.01)
*H04N 21/4784* (2011.01)
*H04N 21/81* (2011.01)
*H04N 21/8545* (2011.01)
*H04H 60/31* (2008.01)
*H04H 60/33* (2008.01)
*H04H 60/91* (2008.01)

(52) U.S. Cl.
CPC ..... *H04N21/23614* (2013.01); *H04N 21/4348* (2013.01); *H04N 21/435* (2013.01); *H04N 21/475* (2013.01); *H04N 21/4784* (2013.01); *H04N 21/812* (2013.01); *H04N 21/8545* (2013.01); *H04H 60/31* (2013.01); *H04H 60/33* (2013.01); *H04H 60/91* (2013.01)
USPC .............. 705/14.1; 705/14.11; 705/14.12; 705/14.13; 705/14.14; 705/14.15; 705/14.16; 705/14.19; 705/14.4; 705/14.41; 725/23

(56) References Cited

U.S. PATENT DOCUMENTS

| | | | |
|---|---|---|---|
| 7,770,209 | B2 | 8/2010 | Billingsley et al. |
| 2002/0168963 | A1 | 11/2002 | Wajs |
| 2004/0030599 | A1 | 2/2004 | Sie et al. |
| 2004/0205810 | A1* | 10/2004 | Matheny et al. ........... 725/23 |
| 2005/0278253 | A1 | 12/2005 | Meek et al. |
| 2006/0294547 | A1 | 12/2006 | Bon et al. |
| 2007/0271589 | A1* | 11/2007 | Yogaratnam et al. ....... 725/113 |
| 2007/0277044 | A1 | 11/2007 | Graf et al. |
| 2007/0282750 | A1 | 12/2007 | Homiller |
| 2008/0141297 | A1 | 6/2008 | Dawson et al. |
| 2008/0172292 | A1 | 7/2008 | Hurowitz et al. |
| 2008/0216163 | A1 | 9/2008 | Pratte et al. |
| 2008/0294510 | A1* | 11/2008 | Gussoni ........................ 705/14 |
| 2009/0055193 | A1 | 2/2009 | Maislos et al. |
| 2009/0177541 | A1* | 7/2009 | Martel et al. ................. 705/14 |
| 2009/0228910 | A1 | 9/2009 | Christinat et al. |

FOREIGN PATENT DOCUMENTS

| | | |
|---|---|---|
| EP | 2 098 971 | 9/2009 |
| WO | WO 00/10327 | 2/2000 |
| WO | WO 02/073967 | 9/2002 |
| WO | WO 2005/098764 | 10/2005 |
| WO | WO 2007/139579 | 12/2007 |
| WO | WO 2009/109583 | 9/2009 |

OTHER PUBLICATIONS

Written Opinion issued in PCT/EP2009/067305, mailed Mar. 2, 2010.
Chris J. Mitchell, "Using Human Interactive Proofs to Secure Human-Machine Interactions Via Untrusted Intermediaries", Internet Citation, retrieved from http://www.isg.rhul.ac.uk/cjm/uhipts.pdf, XP002522627, 2006, 9 pages.
European Search Report issued in EP 08 10 2262, dated Jul. 23, 2008.
U.S. Appl. No. 12/397,434.

* cited by examiner

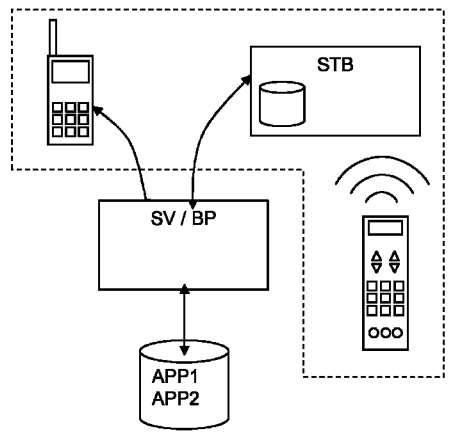
Fig.1
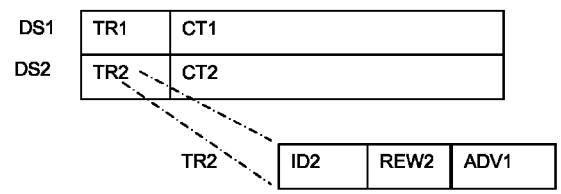
Fig.2
Fig.3

METHOD FOR ACCESSING GOODS OR SERVICES FOLLOWING AN ACTION PERFORMED BY A VIEWER OF BROADCAST PROGRAM CONTENT

TECHNICAL FIELD

The present invention relates to the domain of television broadcasting and also involves techniques used in the domains of data processing and mobile telephony. In particular, the invention concerns a method for the accounting and reporting of viewer's credits, said credits having been accumulated by the viewer as a result of his viewing of certain specific broadcast program content.

BACKGROUND ART

In the field of TV program broadcasting, it is often wished to persuade a viewer to view specific broadcast program content, in particular advertisements. A system aimed at achieving this goal, known as "Reward for Ad", exists and has been described in literature relating to this technical field. The "Reward for Ad" system relates to an advertiser employing techniques to persuade a viewer to continue to view parts of a broadcast which he had not previously intended to view and/or, had the advertiser not employed such techniques, the viewer would normally have a tendency to ignore. The techniques used in this system result in a viewer accumulating rewards in return for viewing certain broadcast program content. However the description of the "Reward for Ad" system does not cover the accounting and reporting of such rewards.

Furthermore, in systems such as the "Reward for Ad" system, the rewards accumulated by the viewer usually take the form of credit for the viewing of further program content broadcast on a pay-per-view or other conditional access basis, this credit usually being stored in a conditional access unit used by the viewer to access the broadcast program. One drawback of this system is that such a reward is not necessarily of interest to all viewers and therefore only a part of the potential viewer base will regard the system as providing suitable incentive to watch the broadcast material targeted by the "Reward for Ad" system.

Another drawback is that the credit is locally stored or managed in the viewer's conditional access unit. This can lead to security issues with the possibility of fraudulent access to said credit. The problem the present invention seeks to solve is to reward viewers for watching specific broadcast material in a modular way, i.e. in such a way as to adapt the reward to coincide with something that a particular viewer is interested in. In this way the reward is disconnected from the conditional access environment and indeed does not necessarily apply solely to a pay-per-view situation. Moreover, according to this invention, the security of the reward mechanism is greatly enhanced so that obtaining credit in a fraudulent manner is much more difficult than in the systems described in the prior art.

Special applications called widgets are described in patent application WO2007/35514, which describes an implementation of widgets being displayed on a television set, these widgets being used for activating specific software programs. The applications behind these widgets generally have a pre-defined function such as for example "Weather broadcast", "Sport", "Broadcast events on other channel". In the available documentation describing the state of the art, the widgets are always visible or available. They are linked to applications of somewhat general interest rather than being directly related to the broadcast program content or more specifically, to the broadcast program content the user is currently viewing. There is no interaction between the content currently being viewed and the widgets displayed as these widgets are managed independently from the viewed content.

SUMMARY OF THE INVENTION

The present invention offers a solution to the problems described above in the domain of rewarding credits to viewers of specific broadcast program content by:
  allowing for a more flexible reward system, with credits being redeemable against a wide variety of goods or services not necessarily related to pay-TV,
  allowing for a more secure reward system,
  allowing for flexible reporting and exchange of credits,
  creating a link between a particular broadcast program content and the interaction of a viewer while viewing said content.

The invention thus proposes a method for accessing goods or services following at least one action performed by a viewer of broadcast program content received by a multimedia unit accessible to a plurality of viewers, said viewer, being one from the plurality of viewers and having a mobile communication device, a user name and a viewer identifier, said multimedia unit being connected to a server, said server having for each viewer identifier a credit log and at least one mobile communication number corresponding to said viewer's mobile communication device, said method comprising the following steps:
  receiving, by the multimedia unit, a user name entered by the viewer;
  selecting the viewer identifier corresponding to said user name;
  receiving a broadcast signal on the multimedia unit via a broadcast channel, said broadcast signal comprising at least said broadcast program content and a trigger, said trigger comprising at least one trigger parameter and being related to said broadcast program content;
  extracting said broadcast program content and said trigger from the broadcast signal;
  upon reception of said trigger, activating a customized application inviting a response from the viewer, said response being specific to said customization;
  receiving the viewer's response;
  authenticating the viewer's response with respect to said customization;
  recording the viewer's response to create a record comprising all or part of the trigger parameter and the viewer identifier;
  transferring the record to the server, said server being remote from the multimedia unit;
  updating a credit log on the server, said credit log pertaining to said viewer identifier, said update being based at least on all or part of the transferred record;
  generating an authenticated message comprising at least a datum relative to all or part of said credit log;
  displaying said authenticated message on the mobile communication device, said authenticated message being the result of a communication between the server and the mobile communication device, thanks to the mobile communication number associated with the viewer identifier, said communication being related to all or part of the credit log;
  presenting said authenticated message to a vendor in order to gain said access to goods or services;
  decoding of said authenticated message by the vendor;

completing an act whereby in exchange for the access to goods or services, said vendor transmits an order to the server, said order comprising data relative to the decoded authenticated message;

retrieving the viewer identifier for the decoded authenticated message; and adjusting the credit log corresponding to the viewer identifier to reflect the result of the completed act.

BRIEF DESCRIPTION OF THE DRAWINGS

The present invention and its advantages will be better understood thanks to the enclosed detailed description of a particular embodiment and to the enclosed drawings, in which:

FIG. 1 schematically describes the elements that are required to implement the method of the present invention;

FIG. 2 shows a simplified representation of some of the constituent parts of an application as described in the present invention according to the method of present invention;

FIG. 3 shows simplified representation of a data stream comprising program content and a trigger according to the method of the present invention;

DETAILED DESCRIPTION OF A PREFERRED EMBODIMENT

Figures 4, 5:
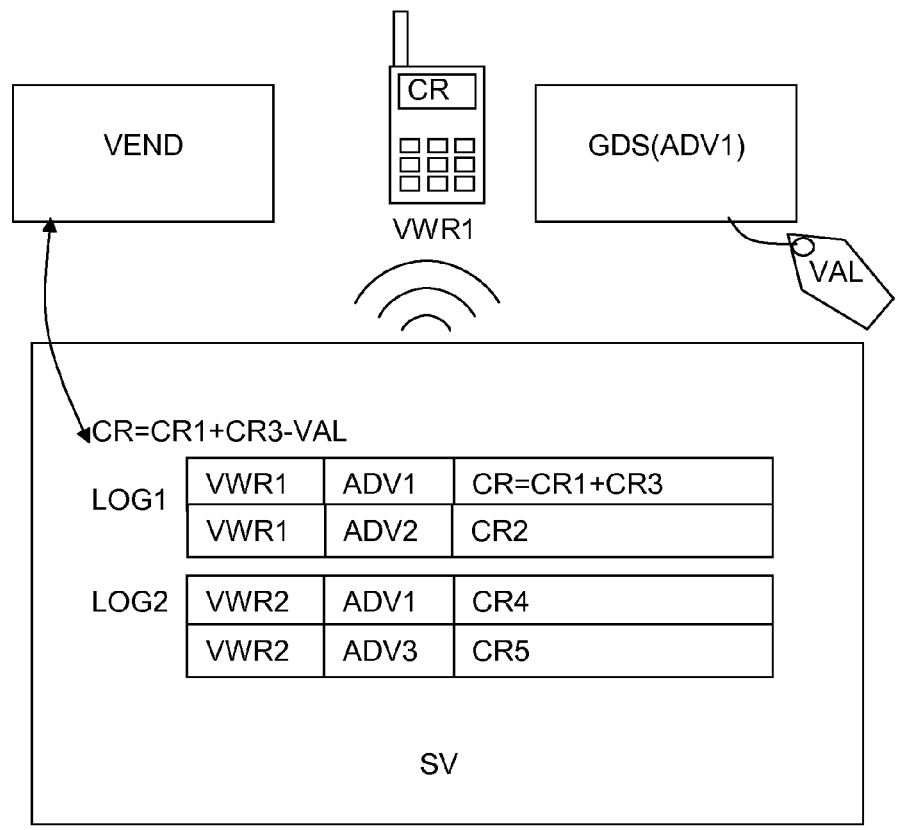
FIG. 4 shows a simplified representation of viewers' credit logs on a server.
FIG. 5 schematically shows how a vendor would debit a viewer's credit log on the server in exchange for goods or services.

With reference to FIG. 1, the method of the invention is carried out by a multimedia unit (STB), such as a television set, connected to a server (SV) on one hand and to at least one broadcast provider (BP) on the other hand. In the present invention, the server and the broadcast provider could either be two separate entities or could be one single entity configured to accomplish both the server and the broadcast functions. As the method of the invention is the same in both cases, both entities are represented by a single block in FIG. 1 (SV/BP).

The connection between the multimedia unit (STB) and the server (SV) is bidirectional and may use the Internet. Data can be transferred from the server to the multimedia unit and vice versa. As an example, an application (APP1, APP2) could be downloaded by the multimedia unit from the server. Conversely, the multimedia unit could return information to the server indicating the broadcast programs that a user of the multimedia unit, i.e. a viewer, has watched.

According to a preferred embodiment of the present invention, the multimedia unit (STB) is able to run an application (APP1, APP2) (FIG. 2), said application (APP1, APP2) being either resident on the multimedia unit or downloaded from the server. The application (APP1, APP2) is a point of entry to an executable software program (PRG1, PRG2) and comprises an integrated collection of procedures, data and a graphical user interface dedicated to a single well-defined task. The graphical user interface can take the form of a picture or text and serves as a focal point upon which the viewer can click or enter data, such as a character string, in order to run the executable software program. The application further comprises an application identifier (ID1, ID2) allowing the application to be uniquely referenced. The software program associated with the application can be executed by selecting the application using navigation keys (for example arrows) on a remote control pertaining to the multimedia unit or launched automatically by the operating system of the multimedia unit.

The multimedia unit also receives a broadcast signal from the broadcast provider (BP), comprising at least a broadcast program. As is well known in the domain of television broadcasting, the broadcast program is transmitted either by satellite connection, terrestrial wireless connection or by cable for example and is transmitted via a data stream comprising, as well a particular broadcast program content, such as a film or an event or a publicity sequence, metadata allowing for the correct reconstitution of the received data stream into a viewable format. According to the invention, a further piece of metadata is included in the data stream, comprising a trigger associated with a particular broadcast program content.

FIG. 3 illustrates a simplified example of data streams (DS1, DS2) comprising content (CT1, CT2) and the content's associated triggers (TR1, TR2). The multimedia unit comprises means to process triggers embedded in the broadcast stream. Each trigger comprises trigger parameters. In this example one of the triggers is associated with an advertiser who puts an amount of credit up for offer. One of the trigger parameters comprised in this trigger may be an advertiser identifier. The trigger may include further trigger parameters such as time and date of broadcast, the amount or value of credit associated with said trigger, a time window during which the trigger can be used to generate a credit or a characteristic text or logo which may be displayed as part of a routine used in processing the trigger.

Each trigger can further make reference to the application identifier thus linking the trigger to an application. When the content and the associated trigger are received by the multimedia unit, the application, whose application identifier is referenced by the trigger, is activated. Activating the application has the effect of causing the application's graphical user interface to be visible on the screen, thereby inviting the viewer to respond by moving a cursor and clicking at some specific area of the screen thus executing the software program associated with the application. The software program associated with the application could be for example to record the fact that the viewer has responded to the invitation to interact and to maintain a credit log on the server.

In one embodiment of the present invention a trigger could be broadcast at some point during the broadcast of an advertisement. The trigger could be included in the broadcast data stream as part of the so-called metadata. The trigger comprises an application identifier corresponding to an application which has been previously downloaded to the multimedia unit from the server.

Upon reception of the trigger, and during the display of the advertisement, the referenced application is activated and a graphic figure is presented on a display associated with the multimedia unit, inviting the viewer to click on it. The viewer clicks on the graphic figure using a suitable interface means such as a remote control unit operably configured as a user interface to the multimedia unit, thereby proving that he is present during the broadcast of the advertisement. The time that the viewer clicked is recorded along with a viewer identifier or a multimedia unit identifier, which is unique to a particular viewer or multimedia unit. A credit log on the server is updated to reflect the fact that a click from the viewer was recorded during the broadcast of the advertisement.

In the embodiment described above, as well as identifying a corresponding application, the trigger includes other trigger parameters such as an advertiser identifier and a reward policy indicating the credit amount that is to be attributed as a reward if the viewer responds. In another embodiment, instead of the reward policy being conveyed by the trigger, it could be built into the software program behind the application or it could even be part of a protocol residing on the server.

In the above embodiment of the present invention, the multimedia unit has a platform or an interface which, upon reception of a trigger and its associated parameters, uses said trigger parameters to generate applications tailored to function in different ways. For example, the trigger may have an advertiser identifier, an advertisement identifier, a number of points or amount of credit available in exchange for a click and a time limit or validity window within which the viewer has to register his click. The interface would then generate an application which displays a graphic showing said advertiser's logo and inviting the viewer to click on it. After an amount of time indicated by the validity window, the graphic would disappear. Otherwise, if the viewer clicks within the allotted time, then a record including the multimedia unit identifier or the viewer identifier, the advertiser identifier and the number of points indicated by the reward policy (this information being extracted from the trigger parameters) is logged on the multimedia unit. The viewer identifier can be derived either through the identification of the multimedia unit in the case that the multimedia unit is personalised for a particular viewer, or by a code or password or any other personalised data entered by the viewer into the multimedia unit. This personalised data could be an account number for a loyalty program for example and could be entered into a plurality of multimedia units pertaining to the same viewer. At some point in time, the record log is transferred to the server, via the bidirectional connection, where it is interpreted and stored as a summary of credit versus viewer identifier on a per-advertiser basis for example. This transfer could be done once a day for example or even directly following a click. Indeed it would also be possible for the processing of the log to be done directly on the multimedia unit and the finished log transferred to the server.

FIG. 4 shows an example of a plurality of credit logs (LOG1, LOG2) relative to different viewers (VWR1, VWR2) who have accumulated various credits (CR1-CR5) for watching broadcast program content from different advertisers (ADV1, ADV2, ADV3).

In one particular embodiment of the present invention, the notion of a central server keeping track of viewing activities of a plurality of viewers becomes key in that it renders the system particularly well-suited for so-called "Follow-Me TV" type of implementations. A "Follow-Me TV" type implementation allows for a viewer to begin viewing a particular broadcast or recording on a first multimedia unit and subsequently to continue viewing the broadcast on a second multimedia unit. This kind of implementation allows for viewing to be carried on between two (or more) multimedia units connected to the server via a fixed type network (e.g. Internet Protocol) or a mobile type network (e.g. GSM) or a mixture of both fixed and mobile type networks. Indeed, the invention allows for the continuation of viewing of content across a plurality of different multimedia units in a non-interrupted fashion regardless of whether each multimedia unit receives the content via RF broadcast, cable broadcast, IP broadcast, mobile telephony means etc.

For example, the viewer could begin to watch a TV broadcast of a football game on his TV set in his living room when for some reason he has to move to another room or even to some place outside of his house. The viewer may then indicate that he would like to continue viewing on another multimedia unit, pause the viewing on the first multimedia unit and then continue viewing on the second multimedia unit, either straight away or at any time of the viewer's choice. The second multimedia unit could of course be another TV set in another room, or a hand-held device, a telephone or PDA etc. even outside of the house.

In the above embodiment the server keeps a record of a viewer's reactions to events generated as the result of a trigger being received by the multimedia unit, for example when the viewer clicks on an icon, regardless of which multimedia unit the viewer uses to register his reaction. Thus the viewer's viewing activity may be logged regardless of the fact that he may switch from one multimedia unit to another during the broadcast or re-play of a particular event. To do this, one way is to simply enable the server to be able to associate each of the multimedia units which may be used by the viewer as belonging to that viewer. This may be done by having a register on the server associating a multimedia unit's multimedia unit identifier with the viewer's viewer identifier. Subsequently, any records sent by any of the viewer's multimedia units will be attributed to the account associated with that viewer identifier. Another way would be to have the viewer go through some type of session login procedure where he keys in some personalised data, such as a user name and/or a password or an account number, to the multimedia unit that he is currently using to receive the broadcast or view the playback of the content such that any subsequent records sent during the current session will be attributed to his log. An example of this type of viewer identification process is when a computer is configured to be used by a plurality of different users, each user having his own dataset set up on the computer. By dataset it is meant a set of data pertaining to one user (or viewer in the case of the multimedia unit), which describes or defines certain aspects pertaining to that user or (viewer). For example such data could be a full name, an address, a date of birth, a mobile communication number, the viewer identifier etc. In order for the user to be able to access his dataset on the computer he will of course have to enter his user name and a password, thus providing a rudimentary level of security indicating that the user is probably authorised to access the computer. From then on it would be reasonable to assume that any credits being accrued during the time that the user is using the computer are indeed attributable to that user. The server will then be able to relate the user name to the correct viewer identifier and the corresponding mobile communication number.

It is worth noting that in the "Follow Me TV" example above, especially in the case where several multimedia units in the same household are involved, rather than having multimedia units for viewing content there could be several viewing apparatus i.e. terminals or clients which would be connected to a local multimedia server in charge of receiving the content and dispatching it to the various viewing apparatus. The local multimedia server would be in charge of handling the follow-me requests, while the remote server would keep track of viewers' credits.

In a situation where it is deemed important not only that a viewer be identified with a reasonable amount of certainty before attributing credit to that viewer, but also that the response to an event generated as a result of a trigger being received by the multimedia unit is indeed made by a viewer and not by an automated system, then strong authentication of the type described hereafter may be used. In a further embodiment of the present invention, a trigger causes the multimedia unit or the viewing apparatus to display the application as described in previous embodiments but with the additional feature whereby the application is customized in that it includes the display of a message comprising one or more specific characters, symbols or strings which require to be interpreted by a viewer. The message is locally generated and therefore is specific to the multimedia unit or viewing apparatus on which it is displayed. The multimedia unit calculates an expected response to the message then compares it with the viewer's response and in the case of a positive match, authorises the attribution of credit for the thus authenticated viewer. The message could be for example "type 1234 followed by OK" or "what is the sum of 2 and 3?" or "move the on-screen cursor from point A to point B".

For even stronger authentication, the process of generating the message and calculating the expected response as described above could be carried out in a security module connected to the multimedia module or the viewing apparatus. The trigger could be received in an Entitlement Control Message or "ECM", which is generally used for transmitting encrypted keys for use in decrypting encrypted content in the pay-TV industry. Each time such a trigger is received, the security module can generate a new unique value as a basis for forming the message to be displayed, thus guaranteeing on one hand that no other multimedia unit/viewing apparatus will display the same message and on the other hand, that it is the viewer who is responding to the message. In this way, thanks to the possibilities of encryption/decryption and random number generation which are available in a security module a very strong authentication is possible. Instead of having an ECM to convey the trigger, it would also be possible to use any other form of encrypted data generally used in the Pay-TV industry, such as certain data within the service information tables (SI tables), for example the Event Information Tables (EIT) or Signal Description Data (SDT).

Concerning reward policies, various reward policies could be possible, for example an advertiser may require that the viewer click once towards the beginning of the broadcast of his advertisement and then again towards the end, with half of the available points being attributed for the first click and the other half for the second click if and only if the two clicks come within specified intervals. Or no points at all unless both clicks are received within two designated time frames etc.

In another embodiment of the present invention, rather than having one or several parameterisable applications generated or resident on the multimedia unit, the application could be downloaded to the multimedia unit from the server via the bidirectional connection once a corresponding trigger has been received by the multimedia unit.

The present invention further provides a means for the convenient reporting of a viewer's accumulated credit in his credit log. By way of the bidirectional communication link, the viewer can at any time query the server as to the status of his credit log and have the result displayed on a mobile communication device such as a personal digital assistant or a mobile telephone via an SMS message or directly via Bluetooth or an infra-red connection if the distance between the viewer and the server allows. Some of these mobile telecommunication devices comprise Wifi capabilities and are able to access the server via this link. During this connection, the credit information is available on the mobile device. The server keeps a register relating viewer identifiers to mobile communication numbers: each mobile communication number pertaining to the mobile communication device which is used by the viewer having that viewer identifier.

In an embodiment of the present invention, an authenticated message such as a character string, a barcode or some other such visual control pattern allowing for authentication procedures to be carried out, could be transferred from the server to the mobile communication device as a means for reporting the viewer's credit log or part thereof. This can be done thanks to the register kept on the server relating each viewer identifier with a mobile communication number. The authenticated message could comprise information indicating all or part of the credit log in encrypted format, the viewer identifier, some of the viewer's personalised details for example his name and address etc. In another embodiment, the authenticated message could be generated on the mobile communication device after having received all or part of the credit log from the server. By authenticated message it is meant that the server is able to verify that the message is genuine and that the particular message corresponds to a valid message that was issued by the server or authorised by the server to be issued.

Furthermore, the present invention provides for a flexible means for redeeming accumulated credit against goods and/or services of a varied nature (FIG. 5). A viewer (VWR1) may buy goods and/or services (GDS(ADV1)) made available by an advertiser (ADV1) subscribing to the method of the present invention, from a vendor (VEND) who has made suitable arrangements with the advertiser. In this case the viewer would show the authenticated graphic to the vendor who would scan the code, thus obtaining all the information necessary to be able to communicate with the server via a bidirectional communication channel such as the Internet and to debit the viewer's credit log (CR1+CR3) by the value of the goods and/or services (CR1+CR3-VAL) by authorising the vendor to debit his credit log on the server by the value (VAL) of the goods. The vendor connects to the server via an Internet connection and debits the viewer's account (CR1-VAL). The server of course keeps track of which barcode was sent to which mobile communication number (i.e. to the viewer having a particular viewer identifier). In this way, when the vendor presents the details obtained from the barcode requesting the server to debit a credit log, the server knows which credit log to debit. Alternatively, the barcode could quite simply comprise the viewer identifier in question and the server would debit the necessary credit log. This bar code being preferably destined for one-time use, the server will no longer accept the same barcode should it be presented twice. If such a case arises, then the viewer may be notified and/or sanctions may be taken against the viewer in reprisal for such misuse.

In a further embodiment of the present invention, in order to render the accounting more flexible, instead of the authenticated graphic comprising information related to the viewer's total credit and having the vendor debit the viewer's log with respect to the credit pertaining to the vendor, the viewer could submit an order for a fixed amount of points which would be deducted from his total credit i.e. not related to a specific vendor. He would then receive an authenticated graphic for the said number of points, the graphic having a certain predefined validity period. This would allow him to use the points at a vendor for any product involved in the reward system. Upon sale of said goods and following the scanning of the graphic, the vendor simply records the sale on the mobile communication device on condition that the validity period has not lapsed. At some later time the viewer will update the server by uploading the information from his mobile communication device. If there have been sales recorded, then the difference between the amount of points that was ordered and the cost of the sale is added to the viewer's log. If there was no sale or the validity period had expired, then the full amount of points that was ordered is added to the log.

The invention claimed is:

1. A method for accessing goods or services following at least one action performed by a viewer of program content broadcast from a broadcast provider to a plurality of receiving devices, the broadcast program content being received by a multimedia unit accessible to a plurality of viewers, said viewer being one from the plurality of viewers and having a mobile communication device and a viewer identifier, said multimedia unit being connected to a server, said server having for each viewer identifier a credit log and at least one mobile communication number corresponding to said viewer's mobile communication device, said method comprising the following steps:

- receiving, by the multimedia unit, personalized data entered by the viewer;
- selecting, by the multimedia unit, the viewer identifier corresponding to said personalized data;
- receiving a broadcast signal on the multimedia unit via a broadcast channel, said broadcast signal comprising at least said broadcast program content and a trigger, said trigger comprising at least one trigger parameter and being related to said broadcast program content;
- extracting, by the multimedia unit, said broadcast program content and said trigger from the broadcast signal;
- upon extraction of said trigger, activating a customized application inviting a response from the viewer, said response being specific to said customization;
- receiving, by the multimedia unit, the viewer's response;
- authenticating, by the multimedia unit, the viewer's response with respect to said customization;
- recording, by the multimedia unit, the viewer's response to create a record comprising all or part of the trigger parameter and the viewer identifier;
- transferring the record to the server, said server being remote from the multimedia unit;
- updating a credit log on the server, said credit log pertaining to said viewer identifier, said update being based at least on all or part of the transferred record;
- generating, at the server, an authenticated message comprising at least a datum relative to all or part of said credit log;
- displaying said authenticated message on the mobile communication device, said authenticated message being the result of a communication between the server and the mobile communication device using the mobile communication number associated with the viewer identifier, said communication being related to all or part of the credit log;
- presenting said authenticated message to a vendor in order to gain said access to goods or services;
- decoding of said authenticated message by the vendor;
- completing an act whereby in exchange for the access to goods or services, said vendor transmits an order to the server, said order comprising data relative to the decoded authenticated message;
- retrieving the viewer identifier associated with the decoded authenticated message; and
- adjusting, on the server, the credit log corresponding to the viewer identifier to reflect the result of the completed act.

2. The method according to claim 1, wherein said application comprises a message, said message comprising at least one customized value generated by the multimedia unit, and further characterized in that said authentication comprises the following steps:

- generating an expected response to the message;
- comparing the viewer's response with the expected response to produce a result of the authentication.

3. The method according to claim 2, wherein a security module is attached to the multimedia unit, at least part of said message being generated in the security module and said authentication being, carried out in the security module.

4. The method according to claim 3, wherein said authentication includes a step of verifying the authenticity of the viewer through comparing a password entered by the viewer with a password corresponding to the viewer's viewer identifier pre-stored on the server.

5. The method according to claim 1, wherein a relationship between said trigger and said broadcast program content is defined via one of said at least one trigger parameters.

6. The method according to claim 1, wherein said multimedia unit comprises an interface to generate said application said interface taking as input said at least one trigger parameter and giving as output said application parameterized at least by said at least one trigger parameter.

7. The method according to claim 1, wherein said application is loaded from the server to the multimedia unit via a bidirectional connection separate from the broadcasting channel, said application being identified by said at least one trigger parameter.

8. The method according to claims 1, wherein said broadcast program content pertains to one of a plurality of advertisers.

9. The method according to claim 1, wherein said update of said credit log is further based at least on a reward policy, said reward policy specifying how said viewer is to be credited for his response, said reward policy being conveyed by at least one of said at least one trigger parameters.

10. The method according to claim 9, wherein said reward policy is stored on the server.

11. The method according to claim 1, wherein said authenticated message is generated at the server and transferred to the mobile communication device.

12. The method according to claim 11, wherein said authenticated message is generated in the mobile communication device.

13. The method according to claim 1, wherein said authenticated message comprises a barcode.

14. The method according to claim 1, wherein said broadcast signal is subsequently received on a second multimedia unit and said application is displayed on the second multimedia unit.

15. The method according to claim 14, wherein said second multimedia unit is the mobile communication device.

16. A method for providing access to goods or services following at least one action performed by a viewer of program content broadcast from a broadcast provider to a plurality of receiving devices, the broadcast program content being received by a multimedia unit accessible to a plurality of viewers, the method comprising:

- receiving a record at a server connected to and remote from the multimedia unit, the record comprising the viewer's response to a customized application, all or part of a trigger broadcast with the program content, and a viewer identifier;
- updating a credit log on the server, said credit log pertaining to said viewer identifier, said update being based at least on all or part of the record received at the server;
- generating by the server an authenticated message comprising at least a datum relative to all or part of said credit log;
- transmitting by the server the authenticated message to a mobile communication device using a mobile communication number associated with the viewer identifier, said communication being related to all or part of the credit log;
- receiving an order at the server from a vendor, the order comprising data relative to the authenticated message, the order being sent to the server in response to a completion of an act by the viewer;

retrieving, by the server, the viewer identifier associated with the authenticated message; and adjusting, by the server, the credit log corresponding to the viewer identifier retrieved by the server to reflect the result of the completed act.

17. The method of claim 16, wherein the trigger comprises at least one trigger parameter and is related to the broadcast program content.

18. The method of claim 16, wherein a relationship between the trigger and the broadcast program content is defined via a trigger parameter.

19. The method of claim 16, wherein said authenticated message comprises a barcode.

* * * * *